March 30, 1965  S. KRAMME  3,175,917
PROCESS FOR MAKING PACKAGED WHIPPED BUTTER IN STICK OR BRICK FORM
Filed Sept. 19, 1960  7 Sheets-Sheet 1

Inventor:
Sivert Kramme
By Wallenstein, Spangenburg & Hattis Attys.

March 30, 1965     S. KRAMME     3,175,917
PROCESS FOR MAKING PACKAGED WHIPPED BUTTER IN STICK OR BRICK FORM
Filed Sept. 19, 1960     7 Sheets-Sheet 6

Inventor:
Sivert Kramme

United States Patent Office 3,175,917
Patented Mar. 30, 1965

3,175,917
PROCESS FOR MAKING PACKAGED WHIPPED BUTTER IN STICK OR BRICK FORM
Sivert Kramme, 5837 S. Talman Ave., Chicago 27, Ill.
Filed Sept. 19, 1960, Ser. No. 56,918
2 Claims. (Cl. 99—179)

The invention primarily relates to a process and apparatus for the production of wrapped sticks or bricks of whipped butter.

Whipped butter is generally made by whipping air into softened butter at temperatures in excess of 40° F. When the whipping process is complete, the butter is generally poured in a still softened condition into cup-shaped cardboard containers and then refrigerated to harden and preserve the same. It is, however, preferable from the standpoint of merchandising, cost, and convenience of handling by the ultimate user to package whipped butter in stick or brick form as in the case of conventional butter. However, due to the nature of whipped butter, the only way in which it has been possible heretofore successfully to package the whipped butter in stick or brick form was manually to wrap pre-cut or pre-formed hardened sticks or bricks of whipped butter which, obviously, was time consuming and expensive. One would think it would be feasible to use conventional automatic butter packaging machinery to wrap the pre-cut hardened sticks or bricks of whipped butter, or to mold soft whipped butter in stick or brick form and then wrap the formed softened butter with the usual wrapping paper, the latter being the common way of wrapping ordinary butter. However, prior to my invention, the processes and machinery used for packaging ordinary butter were found to be inoperable for packaging whipped butter. When previously hardened whipped butter was fed to the butter packaging machines, it came out of the machines in a substantially completely de-aerated condition. When the whipped butter was fed in a still softened condition into the machines, the machines frequently jammed because the soft, airy butter mass oozed through and over normally butter-free parts of the machinery, and, due to loss of air or other factors not entirely understood, the weight of the wrapped packages varied markedly.

It is, accordingly, one of the objects of the invention to provide a practical high speed process for packaging whipped butter in stick or brick form. A related object of the invention is to provide a process as just described which may be carried out using ordinary butter packaging machinery, such as the well-known butter packaging machine manufactured by Hilaire-Blanchette, St. Simon de Drummond of Quebec, Canada, modified, however, in certain respects, all as is hereafter described in detail.

Still another object of the present invention is to provide a process as above described wherein the process of packaging the whipped butter in stick or brick form is so inexpensive that the packaging costs are negligible.

A further object of the present invention is to provide improvements in the butter packaging machines to make them more suitable for handling whipped butter.

In accordance with one aspect of the present invention, it has been discovered that the aforesaid difficulties in the packaging of whipped butter in stick or brick form can be overcome simply and easily by feeding the whipped butter to the packaging machine under closely controlled temperature conditions and prior to the refrigeration thereof which hardens the butter. This results in a high speed, continuous process for both making and packaging the whipped butter.

In accordance with another aspect of the invention, it has been discovered that the successful packaging of whipped butter further depends on the maintenance of air tight or substantially air tight conditions in the feeding of the whipped butter from the whipping apparatus to the packaging machine. When the whipped butter is exposed to outside air for any appreciable period of time, the consistency of the whipped butter is adversely affected to a point where the packaging machinery cannot effectively handle the butter, with the result that spill-over and consequent jamming of the machine frequently occurs and the weight of the formed packaged sticks or bricks of butter varies widely.

To illustrate the more specific aspects of the present invention, a continuous butter whipping and stick or brick packaging operation is carried out by first whipping ordinary butter at closely controlled, lower than usual temperature conditions, in the range of from about 30 to 35° F. Any substantial deviation from this range will produce unsatisfactory results, although minor deviations, for example, 1 to 2 degrees, is intended to be encompassed within the broader aspects of the invention dealing with the temperature controlled conditions of the process. Conventional ice cream making equipment may be used for cooling and whipping air into the butter. The temperature range of the whipped butter should remain within these narrow limits until the packaging operation is completed. If the whipped butter has a temperature much below 30° F., it will not have the desired consistency for handling by the packaging machine because it will harden too quickly and/or will be too brittle and crystalline in character. With temperatures much above 35° F., the product is too sticky to be handled by the packaging machinery.

When the soft whipped butter is handled by the packaging machine, it must have such a consistency throughout that, if one should run a finger through the whipped butter, a smooth surfaced indentation results. This soft smooth consistency of the whipped butter can be maintained for a relatively long period at the low temperatures above referred to (provided it is not exposed to air) because the strange nature of butter is such that it takes a rather long period of time to harden, unlike, for example, vegetable fats used to make oleomargarine. This characteristic of butter has unexpectedly proven to be a help rather than a hindrance because, as previously indicated, if the whipped butter were to harden before it reached the packaging machine, the machine would substantially completely de-aerate the whipped butter. Appreciable exposure of the butter to air will destroy the necessary smooth consistency of the butter and result in a rough surfaced indentation when a finger is run through the butter.

As previously indicated, it has been discovered that the necessary soft smooth consistency of the whipped butter above referred to cannot be maintained unless the whipped butter is fed to the packaging machine under air tight conditions. If a short run is involved between the cooled whipping chamber and the packaging machine, the temperature of the whipped butter can be obtained within the desired range without additional cooling of the butter.

The packaging machine illustrated in the drawings to be described is the Blanchette packaging machine referred to above. This machine has an open-top hopper for receiving soft butter to be packaged. The whipped butter produced by the cooling and whipping unit is carried by an air tight conduit to the hopper. It has been found highly advantageous to enclose the top of the hopper by a cover which is preferably air tight, although perfect air tight conditions at this point are not necessary where the butter in the hopper is immediately fed to the molding and wrapping mechanism. In the Blanchette machine, the hopper has a pair of intermittently rotated fluted rollers or drums which feed the butter intermittently into the top of an open-ended vertical conduit having the same cross section as the stick or brick of whipped butter to be molded and wrapped. A number of feed devices first moves a piece of wrapping paper beneath and then around the bottom of the vertical conduit. An open top mold unit is then moved beneath the vertical conduit where the butter and the paper are forced into the mold by the momentary rotation of the fluted rollers. After the mold is filled, the mold with the paper is moved to a butter discharging and paper folding station.

It has been found that the consistency of the whipped butter in the temperature range of from about 30 to 35° F. is such that it readily drops by force of gravity through the vertical conduit where it leaks from the bottom of the conduit when the mold is moved momentarily away therefrom. In accordance with another aspect of the present invention, this difficulty is overcome by providing added friction along the mold walls thereof as by inserting a metal frame with perforations in the sides thereof within the aforesaid vertical conduit.

In some cases the wrapped sticks or bricks of butter are not put in boxes or containers but are sold with the paper or like wrapping as the only covering therefor. In such case, it is desirable to seal the free ends of the wrapping paper. In the case where ordinary butter is packaged in this way, it was customary to heat seal an end flap of the butter wrapping as a last step in the operation of the butter packaging machine. However, in the case of whipped butter, heat generated by the heat sealing operation discolors and in other ways adversely affects the whipped butter. In accordance with another aspect of the present invention, adhesive applying means are included in said Blanchette butter forming and packaging machine without requiring any modification thereof.

Other features and advantages of the invention as well as those briefly outlined above will be described in detail in the specification to follow, the claims and the drawings wherein:

FIG. 14 is a perspective view of a butter discharging and wrapping station of the butter forming and packaging machine as the mold shown in FIG. 9 is delivered thereto;

Figure 1:
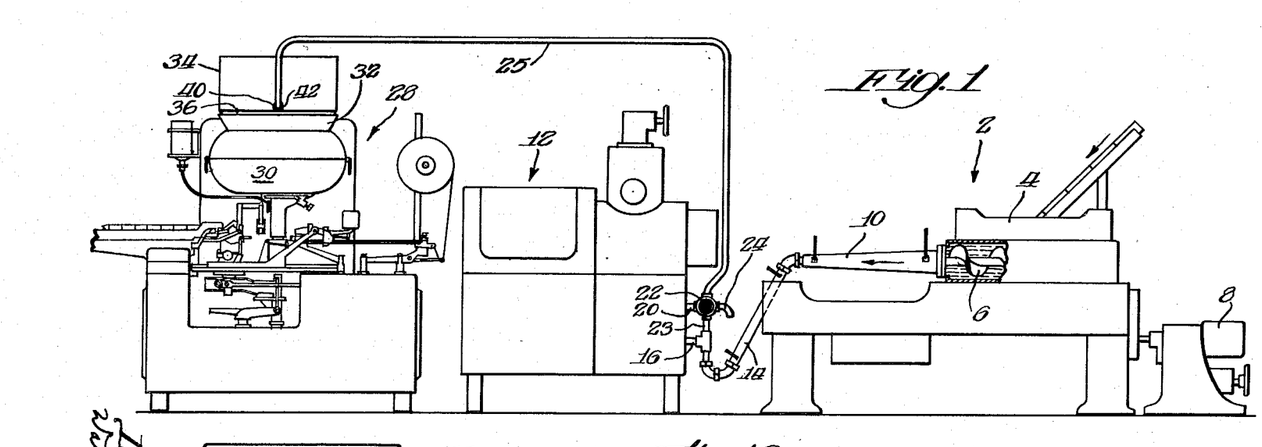
FIG. 1 is an elevational view of the apparatus with which the present process invention may be practiced.

Refer now to FIG. 1 which illustrates the apparatus which may be utilized to practice the present process invention. This apparatus comprises a first butter receiving and feeding unit 2 which receives ordinary butter in a hopper 4. The butter passes into the inlet end of a screw or other suitable conveyor 6 which forces the butter longitudinally through the butter receiving and feeding unit. An electric motor 8 drives the screw conveyor which forces the butter through a longitudinal passageway encased by a water jacket 10 through which water passes at a temperature which softens the butter to a point where it can be readily whipped in a freezing and whipping unit 12. The butter, for example, is raised to a temperature of from 50 to 55° F. A conduit 14 extends to the inlet 16 of the unit 12, which may be a conventional ice cream making unit which includes suitable cooling apparatus for a whipping compartment (not shown), and controls (also not shown) for varying the temperature of the whipping compartment and the rate of flow of air fed thereto. Since such equipment is well known in the ice cream making art, the details of the freezing and whipping unit are not disclosed herein. The amount of air led into the whipping chamber depends upon the degree of aeration of the butter desired. Whipped butter, for example, is often aerated to increase the volume of the original butter 50 to 100%. The present invention operates with practically any percentage of aeration, although its main application has been in the making of whipped butter having this range of aeration.

As above indicated, the butter entering the freezing and whipping unit preferably has a temperature of from 50 to 55° F. The freezing and whipping unit lowers the temperature of the butter in the whipping chamber to about 30 to 35° F. The whipped butter is delivered to an output conduit 20 extending to a suitable valve 22. The valve may be a three-way valve which selectively recirculates the flow of butter by passing it through a return line 23 leading to the inlet 16, or directs it to an open discharge line 24 where samples of the butter can be obtained for testing, or directs it to a main output line or conduit 25. As previously indicated, to mold and wrap successfully the whipped butter, it must have such a smooth consistency that running a finger through a test batch results in a perfectly smooth surfaced indentation. On the other hand, if the indentation has a rough woolly texture, the butter is not of the proper consistency. It has been discovered that the consistency of the butter is not only a function of the temperature conditions under which the butter is whipped but, more importantly, of the isolation of the butter from the surrounding air. The reasons for this are not entirely understood, but, if the butter is exposed to air for as little as a minute or so, it will produce a rough woolly surfaced finger indentation and it will not have the proper characteristics to be handled by a butter molding and wrapping machine, even though its outward appearance seems to be unaffected.

The main output conduit 25 leads to a butter molding and wrapping machine generally indicated by reference numeral 28. As just explained, it is critical to the proper operation of the present process that the whipped butter not be exposed to air for any significant period and to this end, the conduit 25 forms an air-tight passageway.

Figure 2:
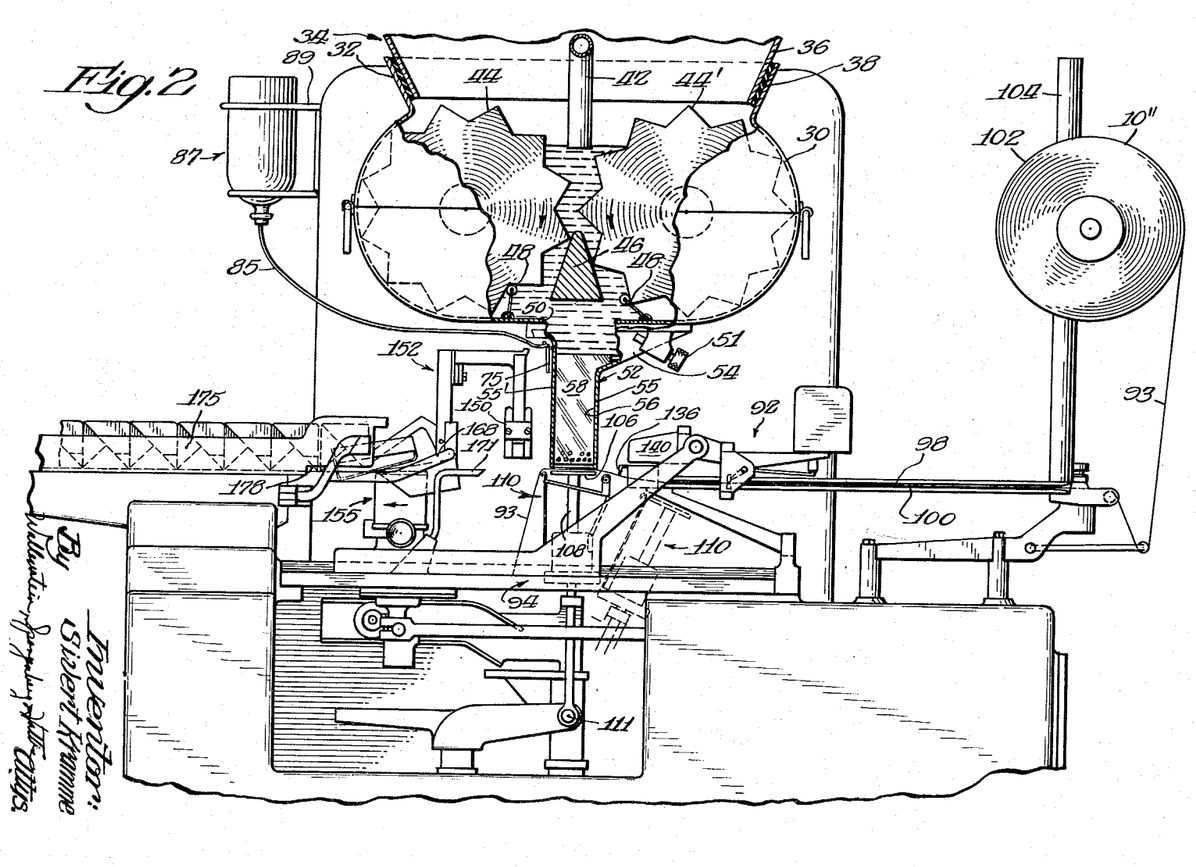
FIG. 2 is a fragmentary enlarged elevational view, partly broken away, showing the main operating instrumentalities of the butter forming and packaging unit forming part of the apparatus shown in FIG. 1.

The butter molding and wrapping machine, as illustrated, is a well known machine manufactured by Hilaire-Blanchette, St. Simon de Drummond of Quebec, Canada. This machine includes an inlet hopper 30 of any suitable design which, as illustrated, has an outwardly flaring normally open upper end 32. In accordance with the present invention, the open upper end of the hopper 30 is enclosed by an open-bottom housing unit 34. This housing unit substantially completely encloses the top of the hopper to isolate the same from the surrounding air. Although in accordance with the broader aspects of the invention, this isolation need not be complete in the sense of being perfectly air-tight if the whipped butter does not remain for any appreciable period in the hopper, it is most preferably air-tight. To this end, the bottom of the housing unit 34 is provided with a downwardly tapering neck portion 36 which fits within the outwardly flaring upper end 32 of the hopper 30. A rubber sealing gasket 38 is squeezed between the neck portion 36 of the housing unit 34 and the outwardly flaring upper end of the hopper. The conduit 25 passes through an opening 40 in the side of the housing unit 34. For best results, a sealing ring or gasket 42 provides an air-tight seal between the conduit and the defining edges of the opening 40 of the housing unit. The end of the conduit 25 has an end portion 42 extending down into the upper portion of the hopper 30 to a point between a pair of fluted feed rolls 44—44'. The feed rolls are rotated in opposite directions so as to direct butter fed therebetween downwardly. The butter is moved by the feed rolls against a triangular separator member 46 which divides the flow of butter into separate sections at this point. The butter is scraped from the feed rolls by wiper blades 48 extending upwardly from the bottom wall of the hopper. The hopper has an opening 50 in the bottom thereof through which the butter passes into an open-ended vertical butter-receiving conduit 52. The conduit 52 has an outwardly flaring upper portion 54 adapted by a screw 51 or other suitable means removably to be mounted to the bottom of the hopper 30. The flaring portion 54 joins a main body portion 56 having approximately the same cross-sectional dimensions as the completed package of whipped butter illustrated in FIG. 18, and having wide front and rear walls 55—55' and narrow side walls 57—57'. The butter-receiving conduit 52 may be replaced by another similar butter-receiving conduit having a differently sized main body portion where a change in the size of the butter to be formed and packaged is desired. In general, the machine is used to wrap either brick sized pieces of butter (FIG. 18) having the dimensions of a pound of ordinary butter or a stick sized body of butter (FIG. 19) having the size of a quarter pound of ordinary butter.

For reasons to be explained, in order to utilize the butter molding and wrapping machine 28 for whipped butter, the butter-receiving conduit 52 is provided with a butter flow retarding member 58 where brick sized wrapped whipped butter is produced by the machine or a smaller sized butter flow retarding member 58' (FIG. 13) where stick sized wrapped whipped butter is produced by the machine.

Figures 10, 11, 12, 13:
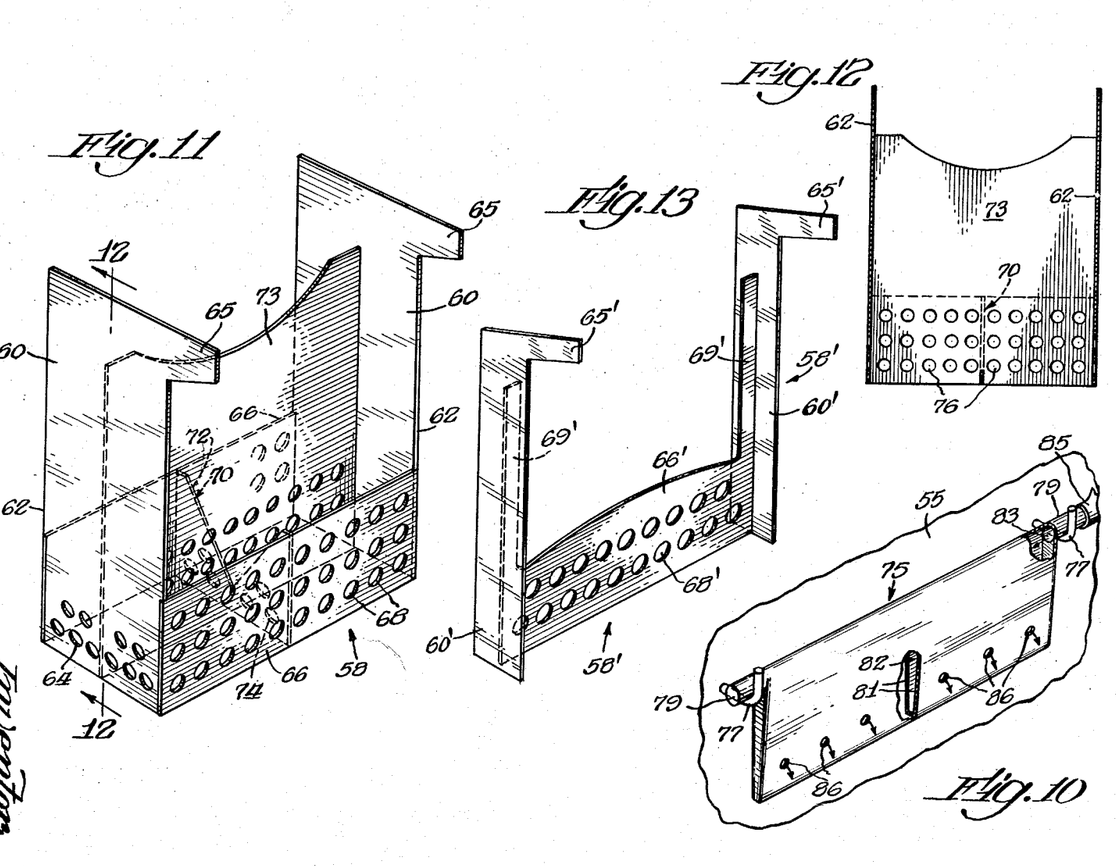
FIG. 11 is a perspective view of a butter flow retarding member which is placed in the butter-receiving conduit to adapt the machine for forming and packaging whipped butter in brick form.
FIG. 12 is a sectional view through the member of FIG. 11, taken substantially along the line 12—12.
FIG. 13 is a perspective view of a butter flow retarding member which is placed in a butter-receiving conduit of reduced size to adapt the machine for forming and packaging whipped butter in stick form.

The butter flow retarding member 58 is shown as comprising a pair of side plates 60—60 which confront the narrow vertical side walls 57—57' of the conduit 52. Each of these side plates is made of sheet metal or other suitable material having a rectangular main body portion 62 which has two rows of perforations 64—64 near the bottom thereof and a laterally projecting upper portion 65—65 providing wings which engage the upwardly flaring upper portion of the conduit 52 to suspend the butter flow retarding member within the conduit.

Figures 18, 19:
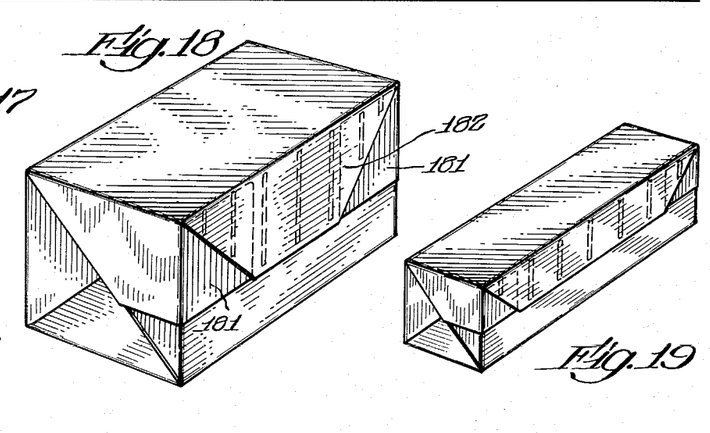
FIG. 18 is a perspective view of the completely wrapped brick of whipped butter.
FIG. 19 is a perspective view of a completely wrapped stick of whipped butter.

Front and rear vertical plates 66—66 are provided which extend between the bottom portions of the side plates 60—60. Each of the plates 66 is provided with horizontal rows of closely spaced perforations 68. A transverse divider plate 70 having a triangular upwardly facing slot 72 extends transversely between the medial portions of the front and rear plates 66—66. The divider plate 70 is provided with vertical columns of perforations 74. A longitudinal divider plate 73 having horizontal rows of perforations 76 extends between the medial regions of the side plates 60—60. The precise number and spacing of the perforations is a function of the size of the block of whipped butter involved. The butter flow retarding member 58 is for the making of a brick of whipped butter of the size and shape of an ordinary pound of butter. FIG. 13 shows a butter flow retarding member 58' for use in the making of a stick of whipped butter having the same size and shape of a quarter pound of ordinary butter (FIG. 19). The flow retarding member 58' has a pair of unperforated side plates 60'—60' sized to confront the side walls of a smaller butter-receiving conduit (not shown) which would be substituted for the removable conduit 52. Only a single vertical perforated plate 66' is here needed which has a narrow perforated bottom portion extending transversely between the lower regions of the side plates 60'—60', and upwardly extending marginal side portions 69'—69' which are soldered or otherwise secured to the inner surfaces of the side plates 60'—60'. The side plates 60'—60' are also provided with wings 65'—65' for suspending the butter flow retarding member within the associated butter-receiving conduit in the same manner as the member 58 is suspended in the associated conduit 52.

Figures 9, 10:
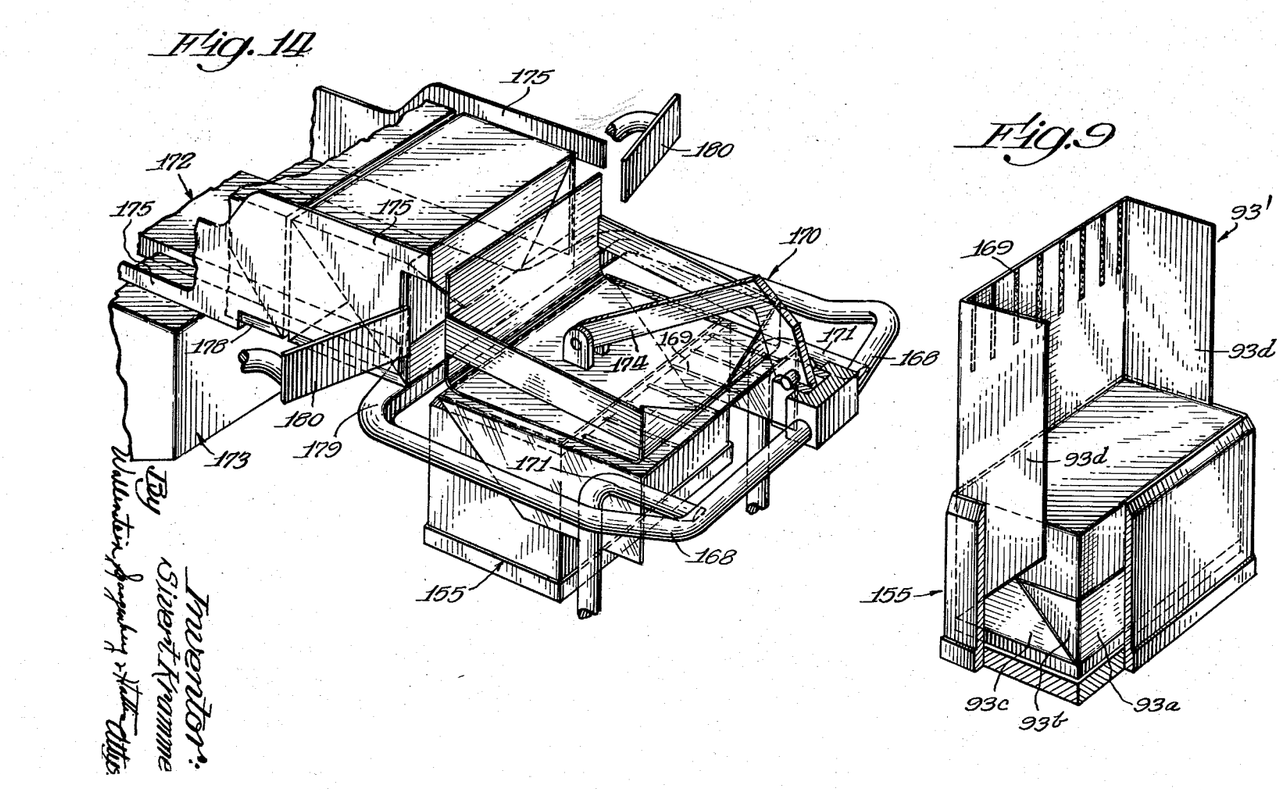
FIG. 9 is a perspective view of the butter mold shown in FIG. 8 after the mold has been moved away from the butter-receiving conduit.
FIG. 10 is a perspective view of the adhesive-applying blade member forming part of the butter molding and packaging machine.

Supported from the rear side wall 55' of the butter receiving conduit 52 is a hollow adhesive-applying blade member 75. As illustrated, the member 75 is supported on the conduit by a pair of hooks (FIG. 10) 77—77 soldered or otherwise secured to the rear wall 55' of the conduit 52, the hooks extending under laterally projecting lugs 79—79 at the upper side extremities of the blade member 75. The blade member has a pair of downwardly converging spaced side walls 81 defining therebetween an adhesive-containing chamber 82. An axial passageway 83 is provided in one of the lugs 79 which communicates with the chamber, and a tube 85 extends from the passageway 83 to the open neck of an inverted bottle of liquid adhesive 87 (FIG. 2) supported by a bracket 89 from the frame of the butter molding and wrapping machine. Adhesive flows from the tube 85 by a force of gravity into the hollow blade member 75. A series of horizontally spaced adhesive discharge openings 86 is provided in the outermost wall 81 through which the liquid adhesive slowly oozes.

Except for the adhesive-applying apparatus just described, the butter flow retarding member 58 and the housing unit 34 for the hopper 30, the butter molding and wrapping machine shown in the drawings is identical to the Blanchette machine referred to above. For this reason, the details of the machine are not described herein. However, the basic operating components of the machine will be explained to the extent necessary to understand the function of the butter flow retarding member 58 and the adhesive-applying apparatus.

Preliminary wrapper folding and butter molding operations are carried out by various means to be described which are brought into play below and around the conduit 52. These means include wrapper feeding mechanism generally indicated by reference numeral 92 (FIG. 2) which feeds the end portion of a strip of wrapper material 93 beneath the open bottom of the conduit 52. The strip of wrapping material is much wider than the conduit 52 for reasons which will become apparent. This mechanism is carried upon a horizontally movable carriage 94 and includes suitable wrapper engaging fingers which engage the upper surface of a horizontal portion of the wrapping material resting upon a stationary feed table 100. The wrapping material unwinds from a roll 102 supported for rotation on a vertical post 104. When the carriage 94 moves to the left, the feeding fingers push the end portion of the strip of wrapping paper beneath the conduit 52 at the same time a wrapper support platen 106 carried on the end of a vertically movable rod 108 (FIG. 3) is raised into position beneath the conduit 52. The rod 108 and the platen 106 form part of a wrapper folding unit 110 which is bodily pivotable about a horizontal pivot 111 (FIG. 2) between the position shown in solid lines in this figure and the position shown in dotted lines therein. This wrapper folding unit 110 has an assembly 113 supported for independent vertical movement around the post 108. The assembly 113 has a pair of vertical support rods 115—115 carrying a horizontal support member 117 having a central opening 119 through which the rod 108 slidably passes. The support member 117 has a pair of vertical wrapper folding walls 121—121 from which are supported a roller support bracket 123. The roller support bracket 123 has a pair of upwardly and outwardly extending pivot lugs 125—125 between which is rotatably supported a horizontal roll 127.

Figures 3, 4, 5:
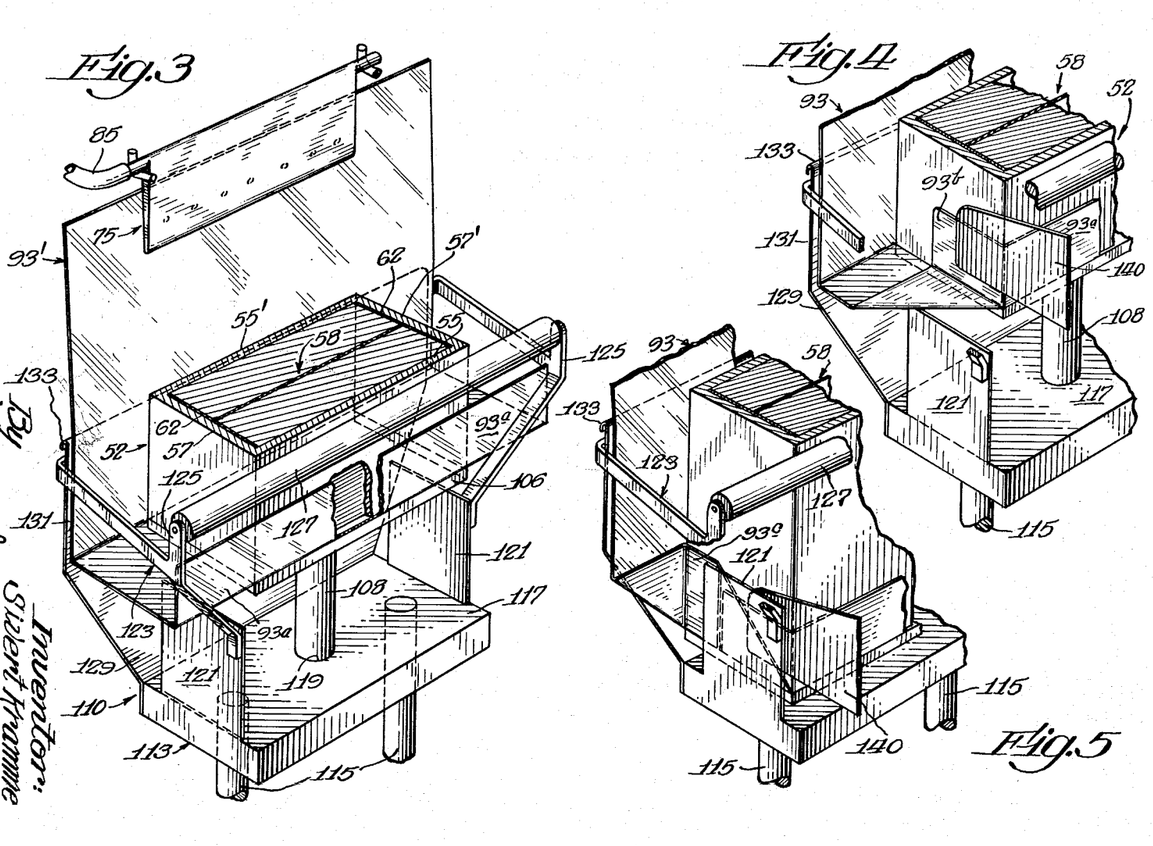
FIG. 3 is an enlarged fragmentary perspective view, partly broken away, of a portion of the butter forming and packaging unit shown in FIG. 2 when a sheet of wrapping paper has been pushed up around the open bottom of a vertical butter-receiving conduit forming a part thereof.
FIG. 4 is a fragmentary perspective view showing the formation of a side fold in the wrapping paper shown in FIG. 3.
FIG. 5 shows a fragmentary perspective view showing the formation of a second side fold in the wrapping paper shown in FIG. 4.

A rear inclined wall 129 extends rearwardly and upwardly from the support member 117 and terminates in a a vertical wrapper engaging wall 131. The roll support bracket 123 passes around the rear of the wall 131.

As previously indicated, the platen 106 is initially raised to a point below the conduit 52 to support the end portion of the strip of wrapping paper beneath the conduit. The carriage 94 moves the aforesaid paper engaging fingers a sufficient distance to the left to carry the front edge of the wrapping paper well beyond the outer end of the platen 106 as shown in FIG. 2. At that point, the roll 127 and the wrapper engaging wall 131 are in a relatively lowered position shown in FIG. 2. Next, the machine raises the support member 117 and the last-mentioned parts carried thereby to bring the upper end 133 of the wall 131 against the drooping front end portion of the wrapping material where it raises and pushes the same against the rear wall of the conduit 52 and the outer wall 81 of the adhesive-applying member 75. The roll 127 pushes the wrapping paper on the opposite side of the conduit against a depending knife blade 136 to sever a piece 93' of the wrapping paper from the strip thereof at a point spaced a small distance from the conduit 52. The roll 127 pushes the severed side of the piece of wrapping paper upwardly against the front wall of the conduit 52 to form a short creased flap 93a.

After the wrapper is folded up around the bottom of the conduit 52, a pair of vertical wrapper folding plates 140—140 is moved horizontally against the sides of the short upwardly extending flap 93a of the wrapper just beyond the sides of the conduit 52 to press the same inwardly to form side folds 93b in the wrapper (FIG. 4). Next, the carrier member 117 is raised further to the position shown in FIG. 5 where the wrapper folding side walls 121—121 fold the still horizontal side portions of the wrapper to form the wrapper folds 93c.

Figures 6, 7, 8:
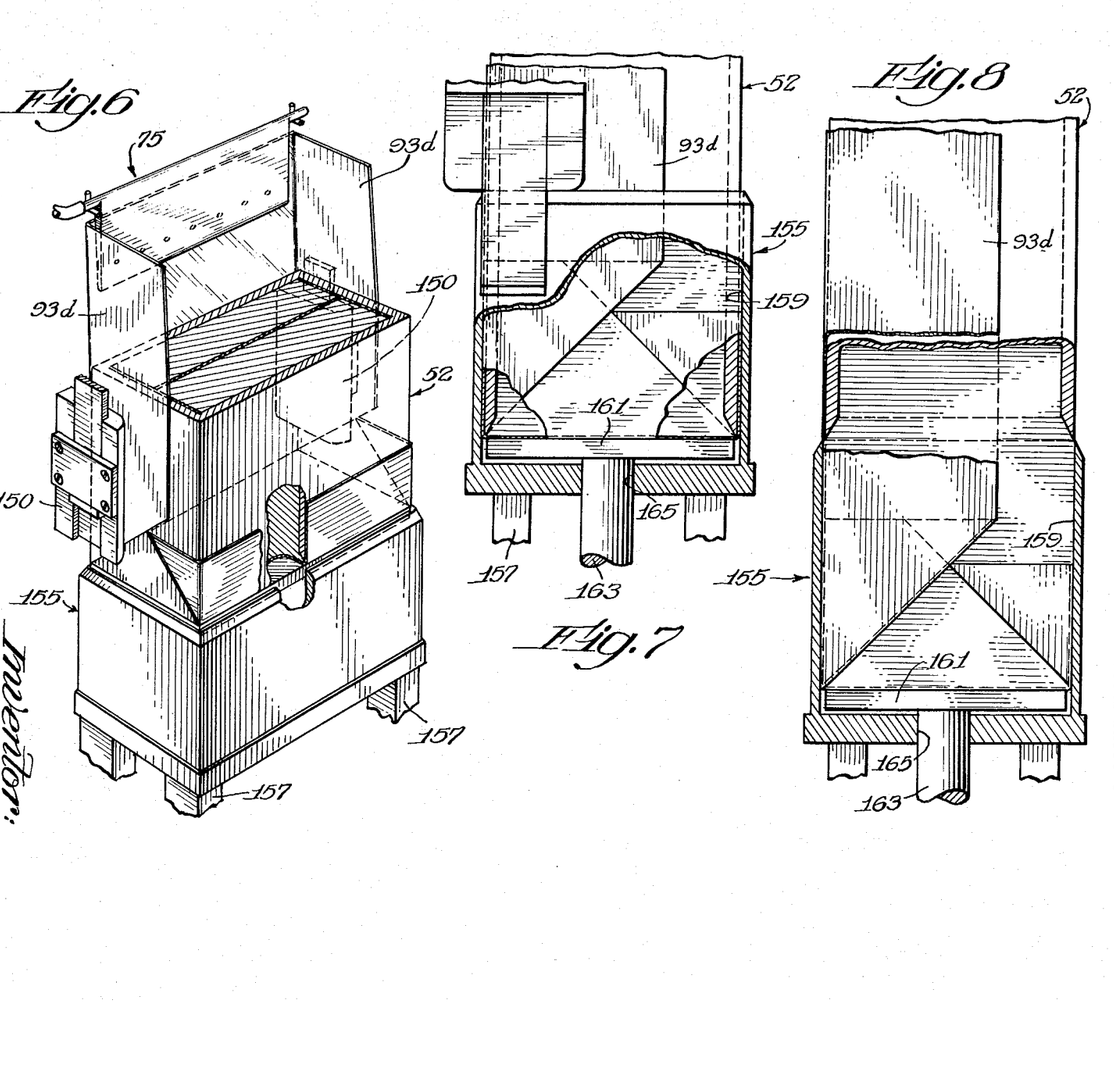
FIG. 6 is a fragmentary perspective view, showing the next step in the operation of the butter and forming and packaging machine wherein the wrapper folding mechanism shown in FIGS. 3–5 has been pivoted out of the way and replaced by an open-top mold underlying the partly folded wrapping paper surrounding the open-bottom butter-receiving conduit, and wherein side folding members have been moved into place around the wrapping paper to form additional side folds therein.
FIG. 7 is an elevational view, partly broken away, showing the next step in the operation of the butter forming and packaging machine wherein the mold has been moved up around the bottom of the butter-receiving conduit and the wrapping paper surrounding the same.
FIG. 8 shows the next step in the operation of the machine wherein the mold has been lowered beneath the butter-receiving conduit and the soft whipped butter and the wrapping paper holding the same have been forced down into the mold.

Next, a pair of butter wrapper folding members 150—150 mounted on a frame 152 are moved to the right to push the sides of the upwardly extending rear portion of the wrapper around the sides of the conduit 52 to form main longitudinal side folds 93d shown most clearly in FIG. 6.

When the wrapper folding members 150—150 move into place around the wrapper, the wrapper folding unit 110 including the platen 106, the support member 117 and the bracket 123 and roller 127 supported thereby are lowered and then pivoted out of the way into the position shown in dotted lines in FIG. 2. The pressure of the folding members 150—150 on the sides of the wrapper is sufficient to hold the same around the butter-receiving conduit 52.

Next, the carriage 94 moves to the right to carry an open top mold 155 into position beneath the butter-receiving conduit 52. In the interim between the movement of the wrapper folding unit 110 out of the way and the movement of the mold beneath the butter-receiving conduit, the whipped butter will not drop through the conduit under force of gravity because of the presence of the wrapper 93' therebeneath and because of the butter flow retarding members 58 within the butter-receiving conduit. The mold 155 is supported for vertical movement upon vertically movable posts 157 (FIG. 6). The mold has a rectangular cavity 159 having the same cross section as the outside of the butter-receiving conduit 52 with clearance left for the folded wrapper. The mold 155 has a vertically movable lift plate 161 which is normally at the bottom of the cavity 159. The lift plate is supported for vertical movement with respect to the mold by means of a vertically movable support rod 163 slidably passing through an opening 165 in the bottom of the mold. The space within the mold between the top of the lowermost position of the lift plate 161 and the top of the mold is to be filled with whipped butter which will form the ultimate brick or stick of whipped butter.

When the mold 155 is in position beneath the butter-receiving conduit 52, the entire mold is raised into position around the butter-receiving conduit. The wrapper folding members 150 are then moved to the left out of the way. When the mold is thusly fully raised so that the bottom of the conduit is adjacent the lift plate 161, timing mechanism of the butter molding and wrapping machine initiates rotation of the fluted feed rolls 44—44' within the hopper 30. Simultaneously, the mold 155 is lowered into the position shown in FIG. 8 where the top of the mold is immediately below the bottom of the butter-receiving conduit 22. As the mold drops, the rotation of the feed rolls 44—44' keep feeding whipped butter into the cavity 159 of the mold which is now lined with the wrapping material to thereby fill the mold with whipped butter.

As the mold moves downwardly, the wrapper, of course, moves down with it. The portion of the wrapper extending above the mold and resting against the outer wall 81 of the adhesive-applying blade member 75 wipes against the liquid adhesive oozing from the openings 86 thereof to apply vertical lines 169 (FIG. 9) of adhesive thereon. When the mold reaches the bottom of its path of travel, the rotation of the feed rolls is stopped by pressure responsive means (not shown). Continued rotation of the feed rolls will result in the build-up of the resistance to rotation of the feed rolls which, in the Blanchette machine illustrated, operates a pressure switch means which terminates the rotation of the feed rolls.

After the mold is thus filled with whipped butter, the carriage 94 is moved to the left cleanly to sever the whipped butter in the mold from the whipped butter within the butter-receiving conduit 52. As the carriage moves to the left, the feeding of a new section of the strip of wrapping material beneath the butter-receiving conduit 52 takes place to start a new operating cycle of the machine.

As the mold 155 is moved from beneath the open bottom of the butter-receiving conduit 52, the butter flow retarding member 58 carries out its intended function of preventing the butter from dropping through the open bottom of the conduit.

As the mold 155 is moved to the left by the carriage 94, the portion of the wrapper extending about the top of the mold (FIG. 9) engages the inwardly extending portions 168—168 of a ring shaped frame member 170 supported from and movable with a carriage frame 172. (The aforementioned frame 152 carrying the folding members 150—150 is connected to and supported by the frame member 170.) The engagement of the upwardly extending portion of the wrapper with the arms 168—168 causes the wrapper to be folded downward into the position shown in FIG. 14 where the resultant sides of the wrapper bend down over the sides of the mold 155. The sides of the wrapper are held close to the mold sides by a pair of stationary arm members 171—171. The carriage frame 172 constitutes a slidable platform on which the completely wrapped packages of whipped butter are carried. When the carriage 94 reaches its left extreme position, the mold is located at a butter discharging and wrapping station generally indicated by reference numeral 173 (FIG. 15).

The ring-shaped frame member 170 movable with the carriage frame 172 has a rearwardly extending arm 174 pivotally mounted on the front thereof and the arm carries an angle plate member 178 pivotally attached thereto which rests on top of the folded wrapper shown in FIG. 14 to hold the same down as it moves to the left of the inwardly extending portions 168—168 of the frame member 170. At the butter wrapping and discharge station, the lift plate 161 in the bottom of the mold cavity is raised to lift the butter out of the mold. In the uppermost position of the lift plate 161, the butter supported thereby is level with a flat base portion 179 of the frame member 170. The angle plate member 178 remains on top of the partially wrapped brick of whipped butter at this point in the operation of the machine.

Figure 15:
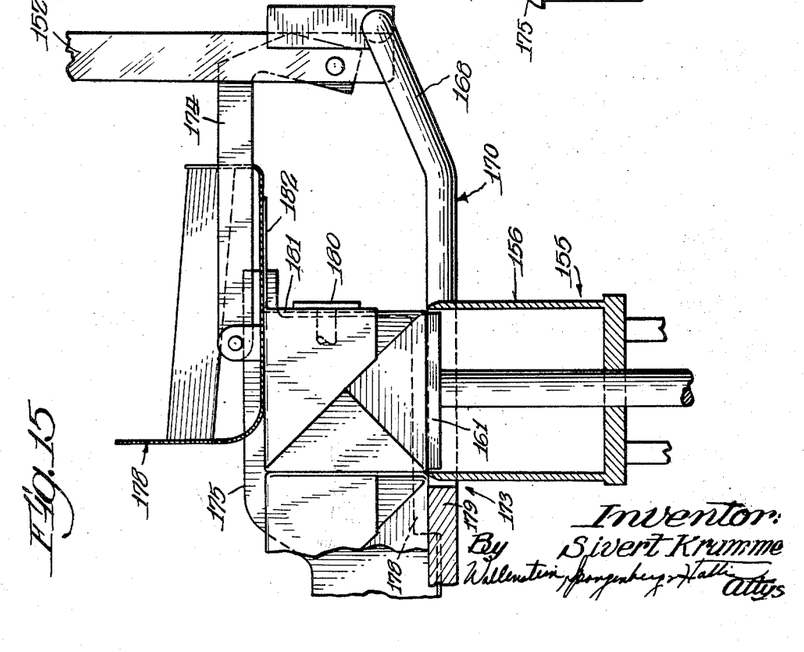
FIG. 15 is an end elevation, partly in section, showing the removal of the butter from the mold at the butter discharging and wrapping station and associated wrapper folding mechanisem in position to complete one of the final folds of the butter wrapping operation.
Figure 16:
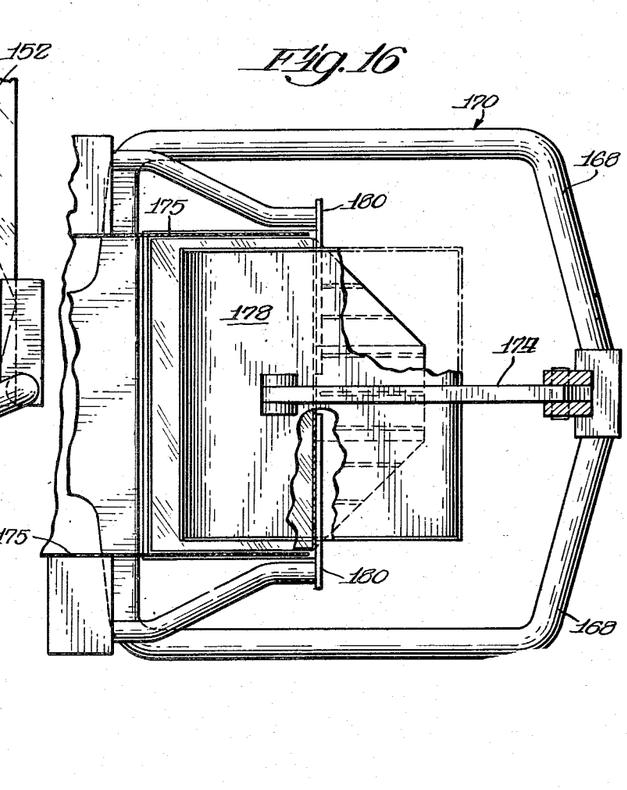
FIG. 16 is a plan view, partly in section, of the apparatus shown in FIG. 15.
Figure 17:
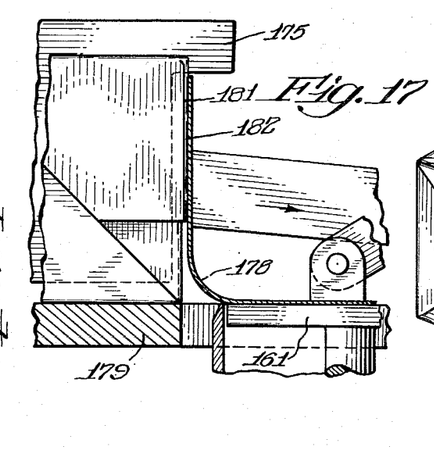
FIG. 17 is a fragmentary elevational view, partly in section, showing the manner in which the final fold in the wrapping operation is made.

Next, a pair of wrapper folding members 180—180 is moved inwardly to fold the front portions of the depending sides of the wrapper around the front of the brick of whipped butter as best shown in FIGS. 15 and 16 to form wrapper flaps 181—181.

The final fold in the wrapper is then effected by the movement of the carriage frame 172 to the right which brings the angle plate member 178 to the front of the brick of whipped butter. As this carriage frame so moves, the wrapper folding members 180—180 remain in place and thus hold the brick of whipped butter stationary while the carriage 172 moves therebeneath. When the angle plate member 178 reaches a point immediately in front of the brick of whipped butter, the movement of the carriage frame 172 is halted and the plate member 178 is then moved downwardly by means not shown against the front of the brick of whipped butter. Simultaneously the wrapper folding members 180—180 are moved outwardly away from the brick of whipped butter and the angle plate member then presses the resulting flap 182 against the wrapper flaps 181—181 enclosing the front surface of the brick of butter. The inner side of the flap 182 contains the lines of adhesive 169 previously applied by the adhesive-applying blade member 75, so that the final folding operation results in a tightly and neatly wrapped package of whipped butter, as shown in FIG. 18, now fully resting on the carriage frame 172.

A pair of spaced guide walls 175—175 extend upwardly from the stationary frame of the machine adjacent the butter discharging and wrapping station 173 and the front end portions of these walls extend beyond the stationary frame at the latter station. These guide walls are unconnected at their front and bottom ends at this point and further include cut-away sections 178 (FIGS. 2 and 14) which provide clearance for the movement of the carriage frame 172 and the ring-shaped frame member 170 attached thereto. The guide walls 175—175 restrain the butter against lateral movement on the carriage frame 172 and so keep the bricks of butter in line as they are moved in step by step fashion to a butter disposing station (not shown). The carriage frame 172 is intermittently moved between extreme right and left hand positions and during each cycle receives a package of whipped butter in the manner explained.

After the last fold sealing operation just described, the carriage frame 172 moves to the right to bring the wrapper folding members 150—150 attached thereto in the manner described around the butter conduit 52 in the manner previously explained to effect the folding of the wrapper for the next brick or whipped butter to be molded around the conduit sides. (Subsequent movement of the carriage 172 to the left as previously explained will obviously move the previously wrapped butter away from the butter wrapping and discharge station 173 to accommodate the next brick of butter to be delivered thereto.)

Simultaneously with the movement of the carriage frame 172 to the right, the carriage 94 is also moved to the right to bring the mold 155 beneath the conduit 52 to carry out the butter molding operation previously described to form a new brick of wrapped butter.

The present invention has thus provided for the continuous production and wrapping of bricks or sticks of whipped butter. Wrapped bricks or sticks of whipped butter of uniform size and weight are produced without spill-over or jamming of the equipment.

I claim:

1. A continuous process of producing wrapped sticks of butter comprising: whipping air into softened butter at a temperature in the range of about 30 to 35° F. to provide soft whipped butter of such smooth consistency that a smooth surfaced indentation is produced when running a finger along the surface thereof, and, substantially immediately after the whipping operation is complete, conveying said butter through a substantially air tight conduit to a butter molding machine where the whipped butter is substantially immediately molded into the desired size and shape while the butter still has said soft smooth consistency and is at a temperature within said temperature range.

2. A process of producing wrapped sticks of butter comprising: whipping air into softened butter at a temperature in the range of about 30 to 35° F. to provide soft whipped butter of such smooth consistency that a smooth surfaced indentation is produced when running a finger along the surface thereof, and, while isolating the same from exposure to surrounding air, feeding the whipped butter with said soft smooth consistency and at a temperature within said range into a wrapper lined open-top mold of the size and shape of the desired finished whipped butter where the wrapper extends partway outside the mold, then folding the wrapper over the top of the butter to enclose the butter in the wrapper.

References Cited in the file of this patent

UNITED STATES PATENTS

| | | |
|---|---|---|
| 1,384,198 | Lietz | July 12, 1921 |
| 1,958,189 | Ecklund | May 8, 1934 |
| 2,617,732 | Thorstensson-Rydberg | Nov. 11, 1952 |
| 2,937,093 | Gorman et al. | May 17, 1960 |
| 2,980,539 | Beverly | Apr. 18, 1961 |

FOREIGN PATENTS

| | | |
|---|---|---|
| 493,437 | Canada | June 9, 1953 |